(12) United States Patent
Sawada

(10) Patent No.: US 7,793,311 B2
(45) Date of Patent: Sep. 7, 2010

(54) DISK APPARATUS AND DISK RECORDING METHOD WITH MULTIPLE DISK STORAGE AND CHANGER

(75) Inventor: Hiroki Sawada, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1075 days.

(21) Appl. No.: 11/494,571

(22) Filed: Jul. 28, 2006

(65) Prior Publication Data
US 2007/0039012 A1 Feb. 15, 2007

(30) Foreign Application Priority Data
Aug. 9, 2005 (JP) ............................. 2005-231355

(51) Int. Cl.
*G11B 17/03* (2006.01)
(52) U.S. Cl. ..................................... 720/607
(58) Field of Classification Search ............... 720/607, 720/614
See application file for complete search history.

(56) References Cited

U.S. PATENT DOCUMENTS 5,872,748 A * 2/1999 Shindo et al. ............ 369/30.85
6,256,270 B1 * 7/2001 Yoshimura ............... 369/30.78
6,310,853 B1 * 10/2001 Ito ............................. 720/607
2002/0172108 A1 * 11/2002 Moreira et al. ........... 369/30.36

FOREIGN PATENT DOCUMENTS

JP 2002-245767 8/2002

* cited by examiner

*Primary Examiner*—David D Davis
(74) *Attorney, Agent, or Firm*—Bacon & Thomas, PLLC

(57) ABSTRACT

There is provided a disk apparatus and disk recording method capable of managing unrecorded disks easily and of recording desired information quickly and easily. In the disk apparatus, a disk recorder DR is provided in a chassis 1, the disk recorder DR having: a tray 4 movable in the forward and backward directions; a drive chassis 5 movable in the upward and downward directions; an optical pickup arranged on the drive chassis 5; and a spindle motor 9 accompanied with a turntable 8, and being adapted to move the drive chassis 5 in the upward direction so that a disk placed on the tray 4 is lifted by the turntable 8 and rotated at a high speed to record information onto the disk through the optical pickup. In the chassis 1, there are provided: a disk repository 20 adjacent to the disk recorder DR and including a disk placing base 24 and a guide frame 25; and a disk setting device 21 for pushing disks D1 to Dn one by one out of the disk repository 20 to set each disk on the tray 4.

4 Claims, 8 Drawing Sheets

DISK APPARATUS AND DISK RECORDING METHOD WITH MULTIPLE DISK STORAGE AND CHANGER

BACKGROUND OF THE INVENTION

1. Field of the Invention

The present invention relates to a disk apparatus and disk recording method, particularly capable of recording video information received by a TV receiver, etc. onto an unrecorded disk quickly and easily.

2. Description of the Prior Art

As a disk apparatus and/or disk recording method, there has conventionally been proposed such a technique as described in Japanese Patent Laid-Open Publication No. 2002-245767. To describe an example of the technique based on FIGS. 10 and 11, which show a so-called DVD recorder, a disk recorder DR is arranged in a chassis 1 composed of a front panel 1*a*, a rear panel 1*b*, and a top panel 1*c*, the disk recorder DR having: a main chassis 2 fixed within the chassis 1; a tray 4 for placing a disk D thereon that is arranged between both side plates 2*a* and 2*b* of the main chassis 2 and is movable in the forward and backward directions "a" and "b" through an opening portion 3 in the front panel 1*a*; and a drive chassis 5 arranged in the main chassis 2 to be driven in the upward and downward directions "c" and "d" by a vertical driving mechanism 6, the drive chassis 5 being provided with an optical pickup 7 movable in the forward and backward directions "a" and "b" and a spindle motor 9 accompanied with a turntable 8, and a disk chucking mechanism 10 is further provided in such a manner as to face the turntable 8.

The vertical driving mechanism 6 has a cam slider 12 arranged in the front part of the main chassis 2 slidably in the left and right directions "e" and "f" perpendicular to the forward and backward directions "a" and "b", where a cam shaft 13 provided on the front surface of the drive chassis 5 in a protruding manner is fitted into a cam groove 12*a* in the cam slider 12, and when the cam slider 12 is slid in the left direction "e" (or the right direction "f"), the drive chassis 5 is driven in the upward and downward directions "c" and "d". It is noted that the numeral 14 in FIG. 10 indicates tray uplift prevention pieces.

The disk chucking mechanism 10 has a crossbeam 16 laid between the both side plates 2*a* and 2*b* of the main chassis 2 and a disk clamper 18 accompanied with a magnet 17 that is arranged on the crossbeam 16 movably within a certain range in the upward and downward directions, the disk clamper 18 being adapted to press and clamp the disk D against the turntable 8 as shown in FIG. 11 (*a*).

To describe an operating procedure for recording video information received by a TV receiver, etc. onto an unrecorded disk D, the tray 4 is moved in the forward direction "a" to place the unrecorded disk D on the tray 4 thus moved in the forward direction "a" as shown in FIG. 11 (*b*), and then the tray 4 is moved in the backward direction "b" based on a loading signal to be housed in the chassis 1. Subsequently, when the cam slider 12 is slid in the right direction "f" (or the left direction "e") to move the drive chassis 5 in the upward direction "c", the disk D on the tray 4 is lifted by the turntable 8 and rotated by the spindle motor 9 at a high speed, as shown in FIG. 11 (*a*), to record the information onto the disk D through the optical pickup 7. It will also be appreciated that information that has already been recorded on the disk D can be reproduced and/or deleted.

In such a conventional arrangement as mentioned above, it is necessary to move the tray 4 in the forward and backward directions "a" and "b" to set unrecorded disks D one by one, which not only takes a lot of trouble to get complicated but also causes a relatively large time loss between mounting of a disk and recording by the disk recorder DR. Further, the management of unrecorded disks D tends to be neglected.

SUMMARY OF THE INVENTION

The present invention has been made in consideration of the above-described conventional disadvantages, and an object thereof is to provide a disk apparatus and disk recording method capable of managing unrecorded disks easily and of recording desired information quickly and easily.

In order to achieve the foregoing object, a first aspect of the present invention is a disk apparatus in which a disk recorder is provided in a chassis, the disk recorder having: a tray movable in the forward and backward directions; a drive chassis movable in the upward and downward directions; an optical pickup arranged on the drive chassis; and a spindle motor accompanied with a turntable, and being adapted to move the drive chassis in the upward direction so that a disk placed on the tray is lifted by the turntable and rotated at a high speed to record information onto the disk through the optical pickup, wherein in the chassis, there are provided a disk repository adjacent to the disk recorder and a disk setting device for pushing disks one by one out of the disk repository to set each disk on the tray, the disk repository having: a disk placing base arranged in the vicinity of the tray with the upper surface thereof being positioned slightly above the tray; a guide frame having an approximate U shape when viewed from above with the inside diameter thereof being set slightly greater than the outside diameter of the disk and arranged above the disk placing base with a clearance greater than one disk's worth of thickness but smaller than two disks' worth of thickness from the upper surface of the disk placing base; and an opening and closing door arranged openably at a disk insertion slot that is opened in the front surface of the chassis in such a manner as to face the guide frame, the disk setting device having: a push-out plate arranged on the disk placing base movably in the horizontal direction and passable through the clearance between the disk placing base and the guide frame with the thickness thereof being set smaller than one disk's worth of thickness; a rack provided integrally on the push-out plate in a protruding manner; and a pinion to be engaged with the rack, it being arranged that when the pinion is driven in the normal direction to cause the push-out plate to enter the clearance between the disk placing base and the guide frame and to push only one disk out of the guide frame to set the disk on the tray, the length of a portion of the push-out plate entering the guide frame is equal to or greater than one-half of the inside diameter of the guide frame, and wherein the opening and closing door is adapted to be opened to insert disks in the guide frame through the disk insertion slot and to place the disks on the disk placing base, and then the pinion in the disk setting device is adapted to be driven in the normal direction to cause the push-out plate to enter the clearance between the disk placing base and the guide frame and to push only one disk out of the guide frame to set the disk on the tray.

A second aspect of the present invention is a disk apparatus in which a disk recorder is provided in a chassis, the disk recorder having: a tray movable in the forward and backward directions; a drive chassis movable in the upward and downward directions; an optical pickup arranged on the drive chassis; and a spindle motor accompanied with a turntable, and being adapted to move the drive chassis in the upward direction so that a disk placed on the tray is lifted by the turntable and rotated at a high speed to record information onto the disk through the optical pickup, wherein in the chassis, there are provided a disk repository adjacent to the disk recorder and a disk setting device for pushing disks one by one out of the disk repository to set each disk on the tray.

In a third aspect of the present invention, the second aspect of the present invention is arranged in such a manner that the disk repository has: a disk placing base arranged in the vicinity of the tray with the upper surface thereof being positioned slightly above the tray; a guide frame having an approximate U shape when viewed from above with the inside diameter thereof being set slightly greater than the outside diameter of the disk and arranged above the disk placing base with a clearance greater than one disk's worth of thickness but smaller than two disks' worth of thickness from the upper surface of the disk placing base; and an opening and closing door arranged openably at a disk insertion slot that is opened in the front surface of the chassis in such a manner as to face the guide frame, and wherein the opening and closing door is adapted to be opened to insert disks in the guide frame through the disk insertion slot and to place the disks on the disk placing base, and then the disk setting device is adapted to push disks one by one out of the guide frame to set each disk on the tray.

In a fourth aspect of the present invention, the third aspect of the present invention is arranged in such a manner that the disk setting device has: a push-out plate arranged on the disk placing base movably in the horizontal direction and passable through the clearance between the disk placing base and the guide frame with the thickness thereof being set smaller than one disk's worth of thickness; a rack provided integrally on the push-out plate in a protruding manner; and a pinion to be engaged with the rack, it being arranged that when the pinion is driven in the normal direction to cause the push-out plate to enter the clearance between the disk placing base and the guide frame and to push only one disk out of the guide frame to set the disk on the tray, the length of a portion of the push-out plate entering the guide frame is equal to or greater than one-half of the inside diameter of the guide frame.

A fifth aspect of the present invention is a disk recording method to be used in a disk apparatus in which a disk recorder is provided in a chassis, the disk recorder having: a tray movable in the forward and backward directions; a drive chassis movable in the upward and downward directions; an optical pickup arranged on the drive chassis; and a spindle motor accompanied with a turntable, and being adapted to move the drive chassis in the upward direction so that a disk placed on the tray is lifted by the turntable and rotated at a high speed to record information onto the disk through the optical pickup, wherein in the chassis, there are provided a disk repository adjacent to the disk recorder and a disk setting device for pushing disks one by one out of the disk repository to set each disk on the tray, the disk repository having: a disk placing base arranged in the vicinity of the tray with the upper surface thereof being positioned slightly above the tray; a guide frame having an approximate U shape when viewed from above with the inside diameter thereof being set slightly greater than the outside diameter of the disk and arranged above the disk placing base with a clearance greater than one disk's worth of thickness but smaller than two disks' worth of thickness from the upper surface of the disk placing base; and an opening and closing door arranged openably at a disk insertion slot that is opened in the front surface of the chassis in such a manner as to face the guide frame, the disk setting device having: a push-out plate arranged on the disk placing base movably in the horizontal direction and passable through the clearance between the disk placing base and the guide frame with the thickness thereof being set smaller than one disk's worth of thickness; a rack provided integrally on the push-out plate in a protruding manner; and a pinion to be engaged with the rack, it being arranged that when the pinion is driven in the normal direction to cause the push-out plate to enter the clearance between the disk placing base and the guide frame and to push only one disk out of the guide frame to set the disk on the tray, the length of a portion of the push-out plate entering the guide frame is equal to or greater than one-half of the inside diameter of the guide frame, and wherein there is provided a processor adapted to be driven by turning a disk setting button on to drive and control the disk setting device and the disk recorder based on detection signals from an in-repository disk detecting sensor and an on-tray disk detecting sensor, the processor being adapted to operate in such a manner that when the disk setting button is turned on, it is determined by the in-repository disk detecting sensor whether or not there is any disk in the disk repository, and if any, it is determined by the on-tray disk detecting sensor whether or not there is no disk on the tray, and if no, the drive chassis is moved in the downward direction so that the turntable gets lower than the tray, and the pinion in the disk setting device is driven in the normal direction to cause the push-out plate to enter the clearance between the disk placing base and the guide frame and to push only one disk out of the guide frame to set the disk on the tray, and then the drive chassis is moved in the upward direction so that the disk on the tray is lifted by the turntable and rotated at a high speed to record information onto the disk through the optical pickup.

In accordance with the disk apparatus according to the first aspect of the present invention, which corresponds to an embodiment (refer to FIGS. 1 to 9), since the disk repository is provided adjacently to the disk recorder in the chassis, it is possible to manage a plurality of unrecorded disks reliably so as not to be lost when housed in the disk repository.

Also, the disk setting device is adapted to push disks one by one out of the disk repository to set each disk in the disk recorder, which takes less trouble over the setting operation relative to the conventional case where the tray is moved in the forward and backward directions to set disks one by one, and thereby makes it possible to record information onto the disk quickly, resulting in having an extremely small time loss between mounting of the disk and recording not to miss an opportunity of recording.

Further, a plurality of disks can be stacked on the disk placing base along the inner surface of the guide frame having an approximate U shape when viewed from above only by opening the opening and closing door and inserting the plurality of disks in the guide frame through the disk insertion slot, which allows the plurality of disks to be managed easily and reliably. In addition, since the clearance greater than one disk's worth of thickness but smaller than two disks' worth of thickness is formed between the disk placing base and the guide frame, it is possible to push out the disks reliably one by one through the clearance.

Furthermore, when the pinion is driven in the normal direction to cause the push-out plate to enter the clearance between the disk placing base and the guide frame and to push only one disk out of the guide frame to set the disk on the tray, a portion of the push-out plate entering the guide frame supports the second disk from the bottom thereon in a horizontal attitude. Therefore, after the setting is completed, the push-out plate can be retracted smoothly from the clearance and put back to the original position by driving the pinion in the reverse direction, and further the second disk from the bottom can be placed on the disk placing base in a predetermined manner.

In accordance with the second aspect of the present invention, which corresponds to a fundamental mode, since the disk repository is provided adjacently to the disk recorder in the chassis, it is possible to manage a plurality of unrecorded disks reliably so as not to be lost when housed in the disk repository.

Also, the disk setting device is adapted to push disks one by one out of the disk repository to set each disk in the disk recorder, which takes less trouble over the setting operation relative to the conventional case where the tray is moved in the forward and backward directions to set disks one by one, and thereby makes it possible to record information onto the disk quickly, resulting in having an extremely small time loss between mounting of the disk and recording not to miss an opportunity of recording.

In accordance with the third aspect of the present invention, a plurality of disks can be stacked on the disk placing base along the inner surface of the guide frame having an approximate U shape when viewed from above only by opening the opening and closing door and inserting the plurality of disks in the guide frame through the disk insertion slot, which allows the plurality of disks to be managed easily and reliably. In addition, since the clearance greater than one disk's worth of thickness but smaller than two disks' worth of thickness is formed between the disk placing base and the guide frame, it is possible to push out the disks reliably one by one through the clearance.

In accordance with the fourth aspect of the present invention, when the pinion is driven in the normal direction to cause the push-out plate to enter the clearance between the disk placing base and the guide frame and to push only one disk out of the guide frame to set the disk on the tray, a portion of the push-out plate entering the guide frame supports the second disk from the bottom thereon in a horizontal attitude. Therefore, after the setting is completed, the push-out plate can be retracted smoothly from the clearance and put back to the original position by driving the pinion in the reverse direction, and further the second disk from the bottom can be placed on the disk placing base in a predetermined manner.

In accordance with the disk recording method according to the fifth aspect of the present invention, when the disk setting button is pressed to put the processor into operation, the disk setting device can be driven and controlled to push only one unrecorded disk out of the guide frame in the disk repository to set the disk on the tray, and subsequently the disk recorder can be driven and controlled to record information onto the unrecorded disk, whereby the series of operations can be performed more quickly relative to the conventional case where the tray is moved in the forward and backward directions to set disks one by one for recording.

DESCRIPTION OF THE PREFERRED EMBODIMENTS

Figure 1:
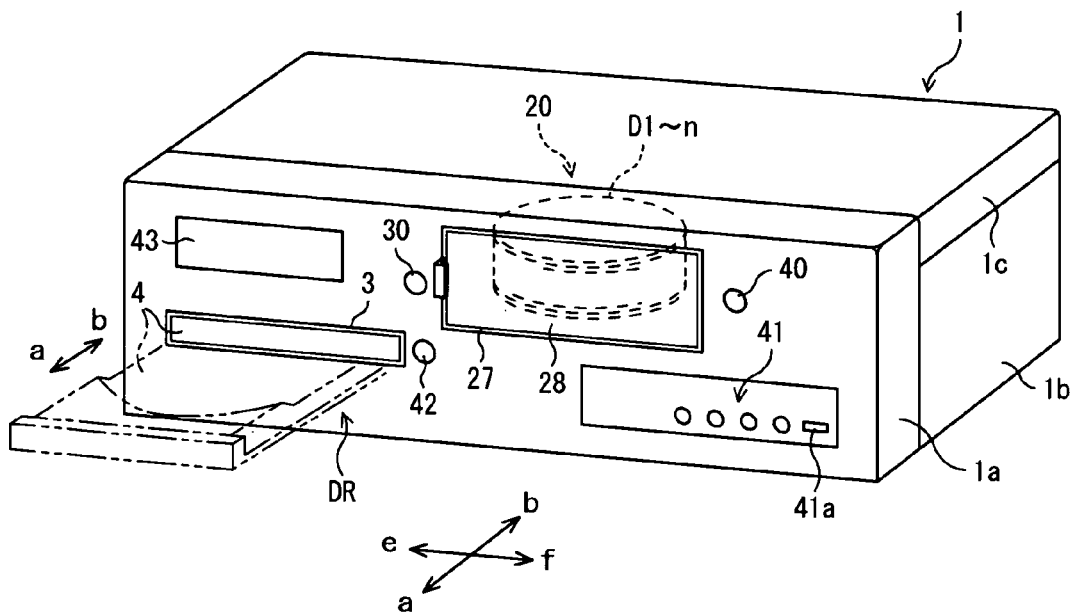
FIG. 1 is a perspective view showing a DVD recorder (disk apparatus) according to an embodiment of the present invention.

FIGS. 1 to 7 show a DVD recorder (disk apparatus) according to an embodiment of the present invention, in which in a chassis 1, there are provided a disk repository 20 adjacent to a disk recorder DR and a disk setting device 21 for pushing unrecorded disks D1 to Dn one by one out of the disk repository 20 to set each disk on a tray 4. Since arrangements other than above are approximately the same as those shown in FIGS. 10 and 11, the same components are designated by the same reference numerals to omit the description thereof.

In accordance with the arrangement above, since the disk repository 20 is provided adjacently to the disk recorder DR in the chassis 1, it is possible to manage a plurality of unrecorded disks D1 to Dn reliably so as not to be lost when housed in the disk repository 20.

Also, the disk setting device 21 is adapted to push unrecorded disks D1 to Dn one by one out of the disk repository 20 to set each disk in the disk recorder DR, which takes less trouble over the setting operation relative to the conventional case where the tray 4 is moved in the forward and backward directions "a" and "b" to set disks D1 to Dn one by one, and thereby makes it possible to record information onto the disks D1 to Dn quickly, resulting in having an extremely small time loss between mounting of the disk and recording not to miss an opportunity of recording.

Figure 3:
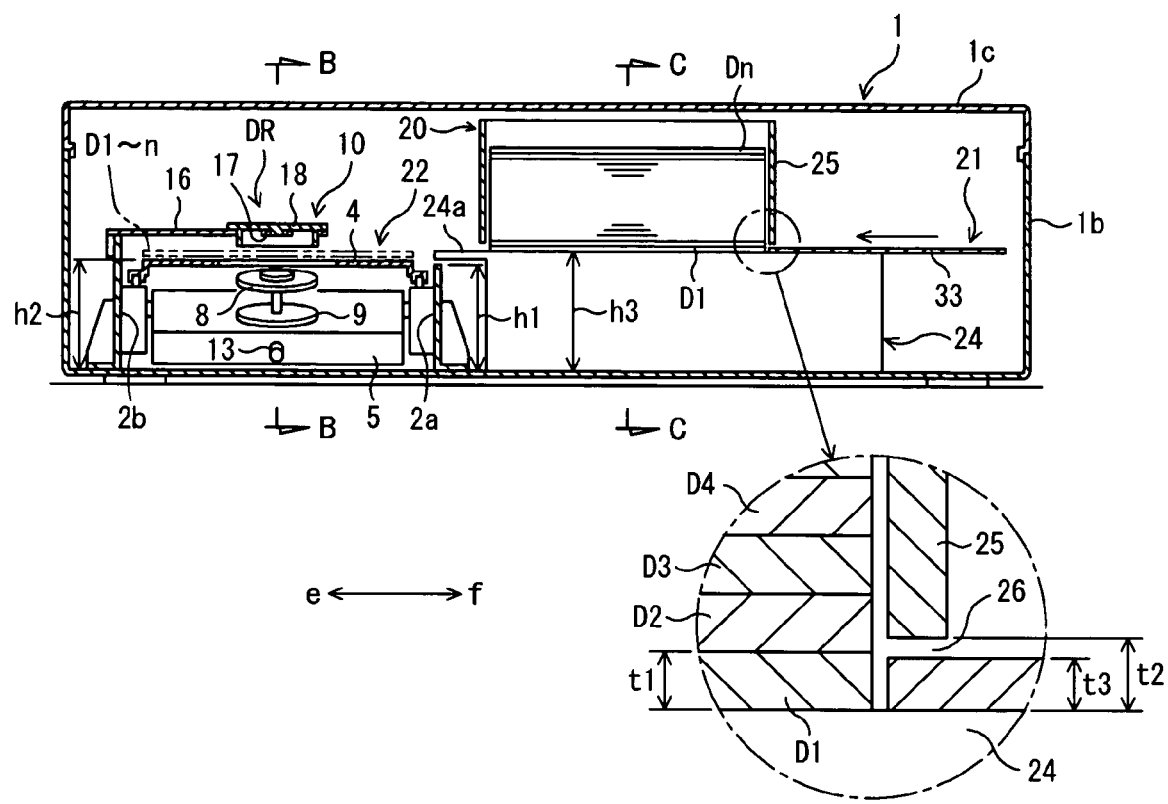
FIG. 3 is a view indicated by the arrow line A-A in FIG. 2.
Figure 4A:
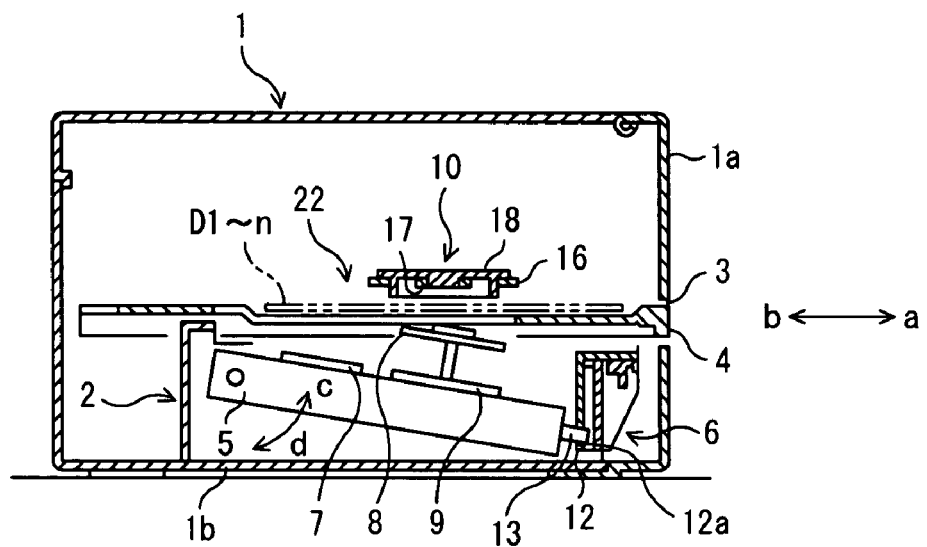
FIG. 4 (a) is a view indicated by the arrow line B-B in FIG. 3 and FIG. 4 (b) is a vertical cross-sectional view showing a state of recording in the DVD recorder.
Figure 4B:
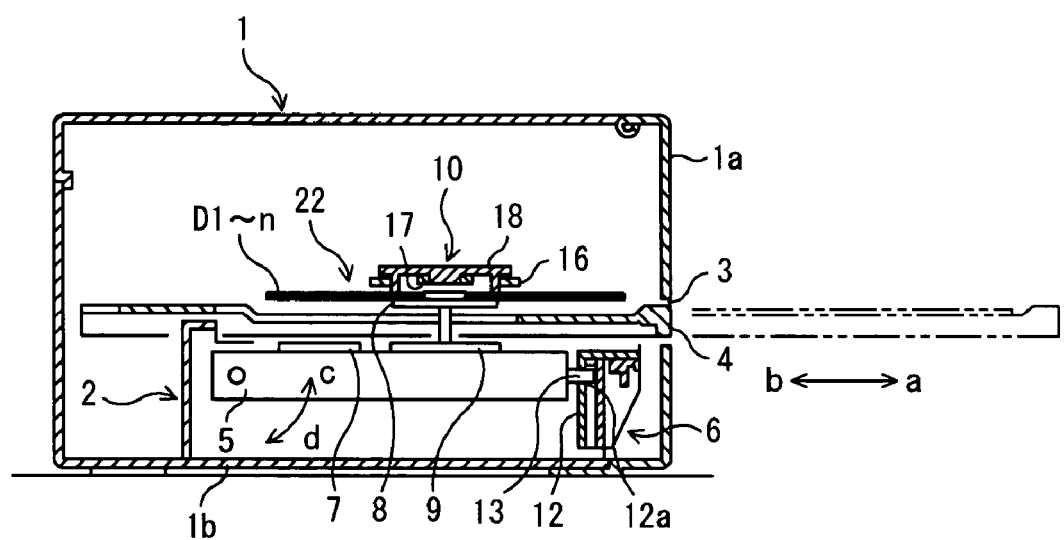
Figure 10:
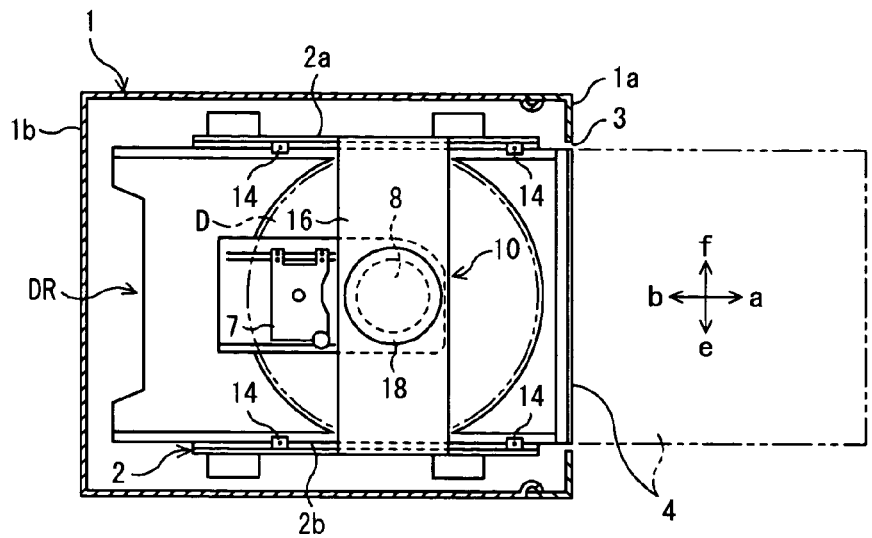
FIG. 10 is a horizontal cross-sectional view showing a conventional example.
Figure 11:
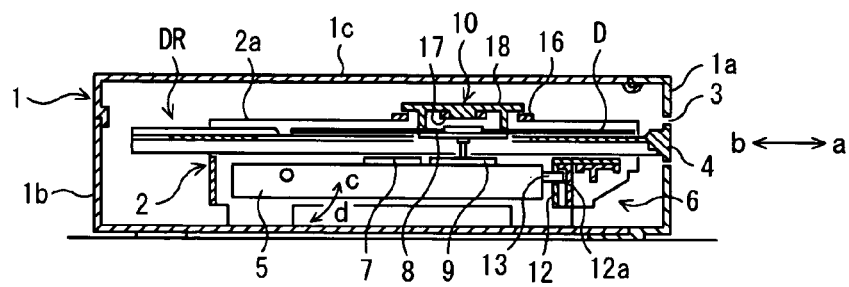
FIG. 11 (a) is a vertical cross-sectional view showing a state of recording and FIG. 11 (b) is a vertical cross-sectional view showing a state of unloading in the conventional example.
Figure 11:
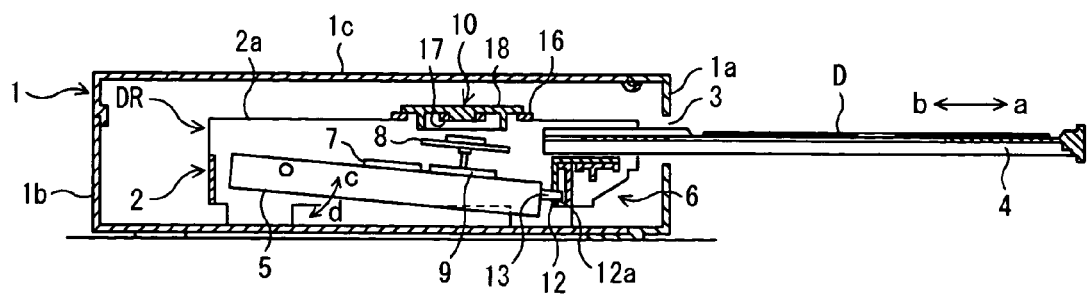

The structure of the disk recorder DR is approximately the same as that of the disk recorder DR shown in FIGS. 10 and 11, except that the height h1 of one side plate 2a of the main chassis 2 that is adjacent to the disk repository 20 is set smaller than the height h2 of the tray 4, and that the length of the crossbeam 16 of the disk chucking mechanism 10 is reduced by approximately half so that the crossbeam 16 is fixed to the other side plate 2b in a cantilevered manner as shown in FIG. 3. Thus, a clearance 22 for setting the disks D1 to Dn on the tray 4 therethrough is formed between the side plate 2a and the crossbeam 16.

Figure 2:
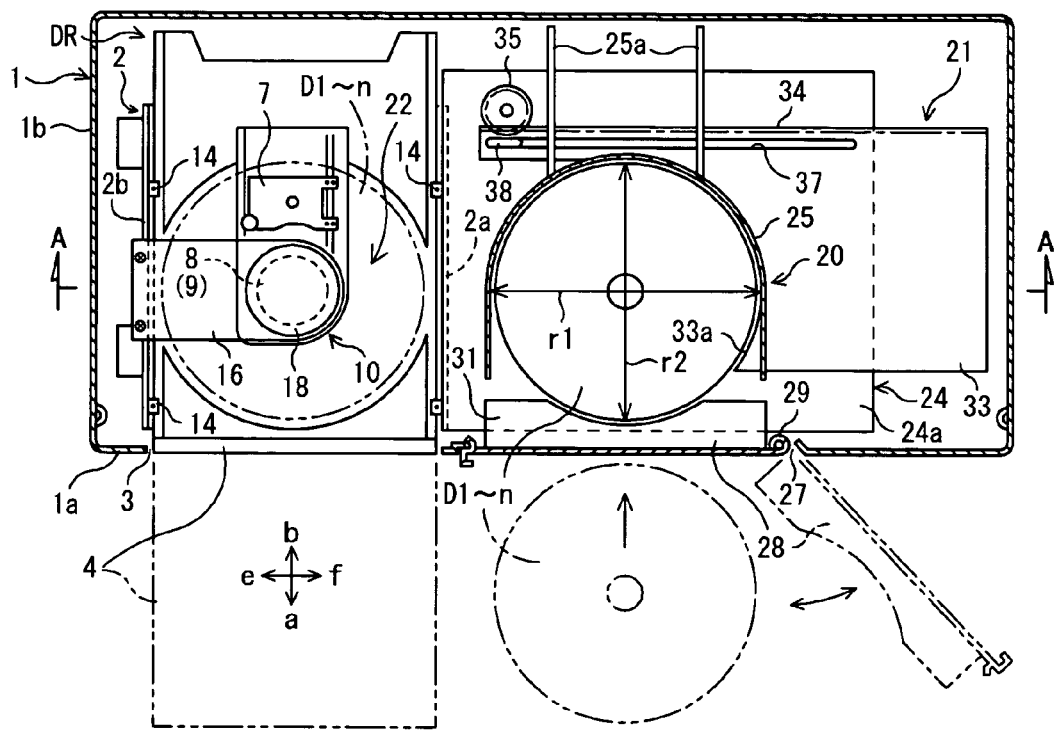
FIG. 2 is a horizontal cross-sectional view of the DVD recorder.
Figure 5:
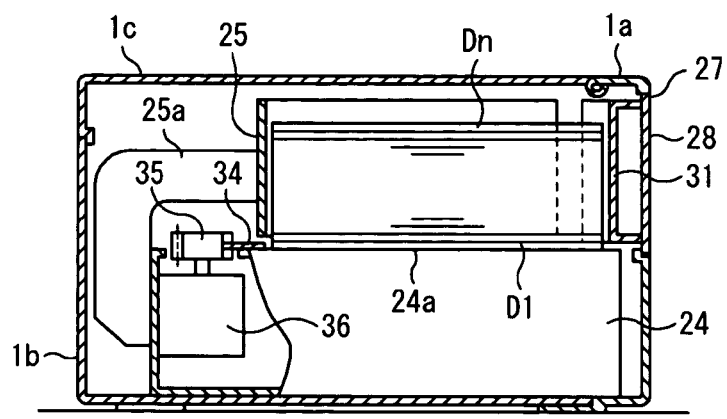
FIG. 5 is a view indicated by the arrow line C-C in FIG. 3.
Figure 6:
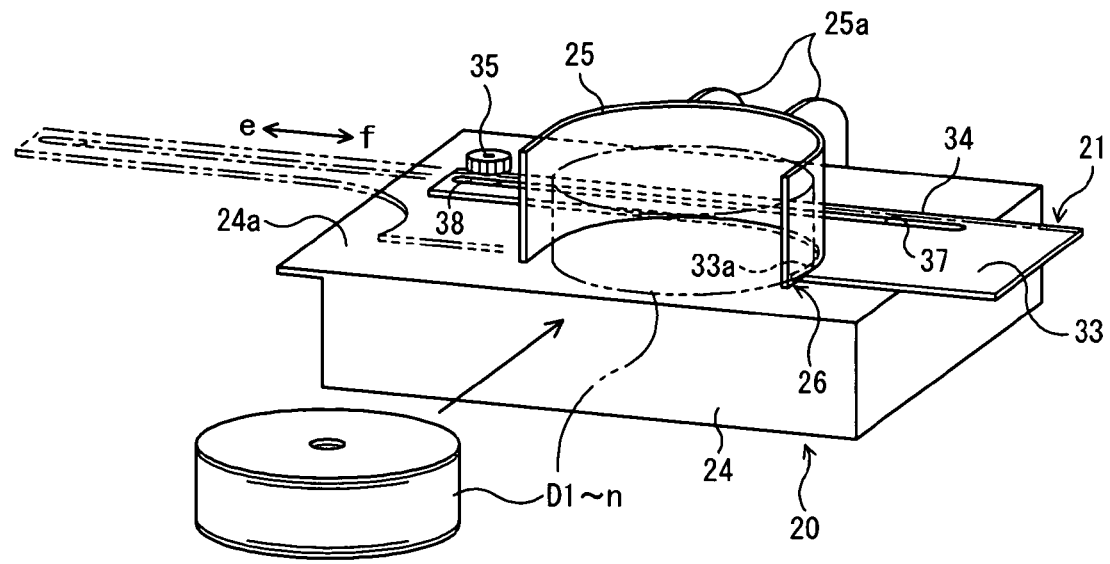
FIG. 6 is a perspective view of a substantial part in the DVD recorder.

As shown in FIGS. 3, 5, and 6, the disk repository 20 has: a disk placing base 24 arranged in the vicinity of the tray 4 with the height h3 of the horizontal upper surface 24a thereof being set slightly greater than the height h2 of the tray 4 so that the upper surface 24a is positioned slightly above the tray 4; and a guide frame 25 having an approximate U shape when viewed from above and fixed to the disk placing base 24 via fixing rods 25a, the guide frame 25 being arranged above the disk placing base 24 with a clearance 26 of t2 that is greater than one disk's worth of thickness t1 (for the disks D1 to Dn) but smaller than two disks' worth of thickness (t1×2) from the upper surface 24a of the disk placing base 24, and the inside diameter r1 of the guide frame 25 is set slightly greater than the outside diameter r2 of the disks D1 to Dn as shown in FIG. 2.

Also, as shown in FIGS. 1 and 2, a disk insertion slot 27 is opened in the front panel 1a of the chassis 1 in such a manner as to face the forward opening portion of the guide frame 25, and an opening and closing door 28 is arranged openably at the disk insertion slot 27 centering on a pivoting axis 29, where when an opening button 30 (refer to FIG. 1) provided beside the disk insertion slot 27 is pressed, the lock of the opening and closing door 28 is released and the opening and closing door 28 can be opened (refer to the virtual line in FIG. 2). It is noted that the numeral 31 in FIG. 2 indicates a disk pressing frame fixed firmly to the back side of the opening and closing door 28, the frame being adapted to cover the forward opening portion of the guide frame 25 to prevent disks D1 to Dn in the guide frame 25 from being displaced forward.

In accordance with the arrangement above, a plurality of disks D1 to Dn can be stacked on the disk placing base 24 along the inner surface of the guide frame 25 having an approximate U shape when viewed from above only by opening the opening and closing door 28 and inserting the plurality of disks D1 to Dn in the guide frame 25 through the disk insertion slot 27, which allows the plurality of disks D1 to Dn to be managed easily and reliably. In addition, since the clearance 26 greater than one disk's worth of thickness t1 (for the disks D1 to Dn) but smaller than two disks' worth of thickness (t1×2) is formed between the disk placing base 24 and the guide frame 25, it is possible to push out the disks D1 to Dn reliably one by one through the clearance 26.

As shown in FIGS. 2 and 5 to 7, the disk setting device 21 has: a push-out plate 33 arranged on the disk placing base 24 movably in the horizontal direction along the left and right directions "e" and "f" and passable through the clearance 26 between the disk placing base 24 and the guide frame 25 with the thickness t3 thereof (refer to FIG. 3) being set smaller than one disk's worth of thickness t1 (for the disks D1 to Dn); a rack 34 provided integrally on the push-out plate 33 in a protruding manner and extending along the left and right directions "e" and "f"; a pinion 35 to be engaged with the rack 34; and a set motor 36 for rotating the pinion 35 in the normal and reverse directions "g" and "h", the inner peripheral edge 33a of the push-out plate 33 facing the disks D1 to Dn being formed in an arc shape having the same diameter as the inner peripheral surface of the guide frame 25, an elongated guide groove 37 being formed in the rack 34 along the left and right directions "e" and "f", and a guide piece 38 is provided on the disk placing base 24 in a protruding manner to fit into the guide groove 37 and to face the pinion 35, the push-out plate 33 being adapted to be slid in the left and right directions "e" and "f" along the guide piece 38.

Figure 7:
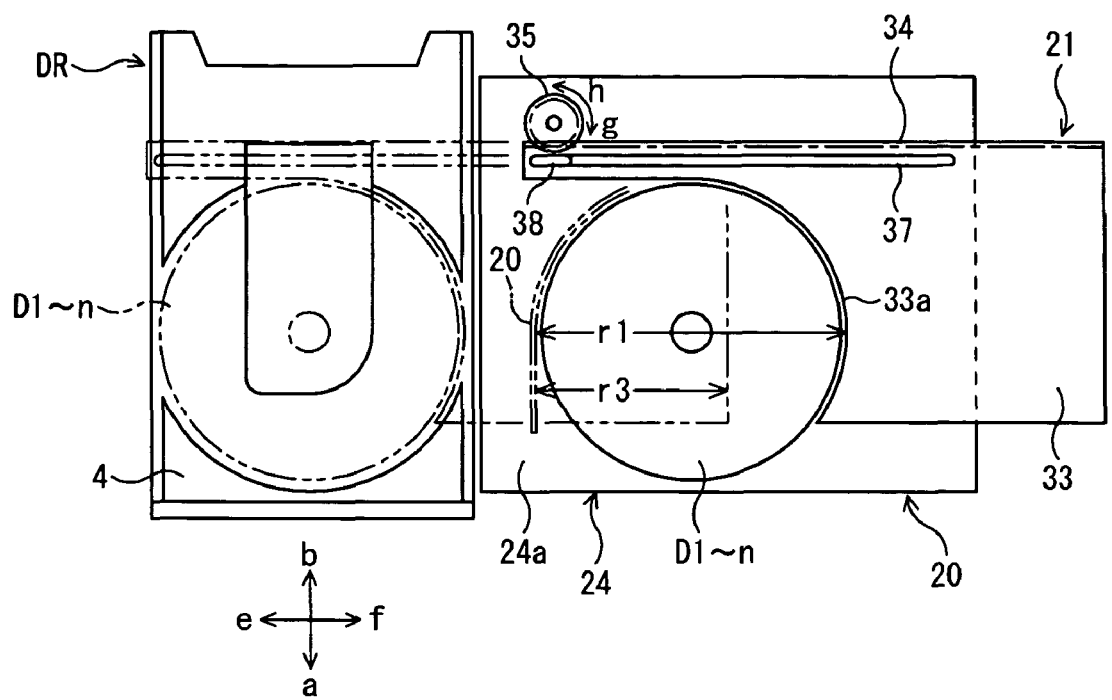
FIG. 7 is a plan view of a substantial part in the DVD recorder.

As indicated by the virtual line in FIG. 7, it is arranged that when the pinion 35 is driven in the normal direction "g" to cause the push-out plate 33 to enter the clearance 26 between the disk placing base 24 and the guide frame 25 and to push only one disk D1 out of the guide frame 25 to set the disk on the tray 4, the length r3 of a portion of the push-out plate 33 entering the guide frame 25 is equal to or greater than one-half of the inside diameter r1 of the guide frame 25.

In accordance with the arrangement above, when the push-out plate 33 pushes only one disk D1 out of the guide frame 25 to set the disk on the tray 4, a portion of the push-out plate 33 entering the guide frame 25 supports the second disk D2 from the bottom thereon (refer to FIG. 3) in a horizontal attitude. Therefore, after the setting is completed, the push-out plate 33 can be retracted smoothly from the clearance 26 and put back to the original position (refer to the solid line in FIG. 7) by driving the pinion 35 in the reverse direction "h", and further the second disk D2 from the bottom can be placed on the disk placing base 24 in a predetermined manner.

In FIG. 1, the numerals 40, 41, 42, and 43 indicate, respectively, a disk setting button, an operating section including a power button 41a, etc., an eject button for moving the tray 4 in the forward and backward directions "a" and "b", and a display.

Figure 8:
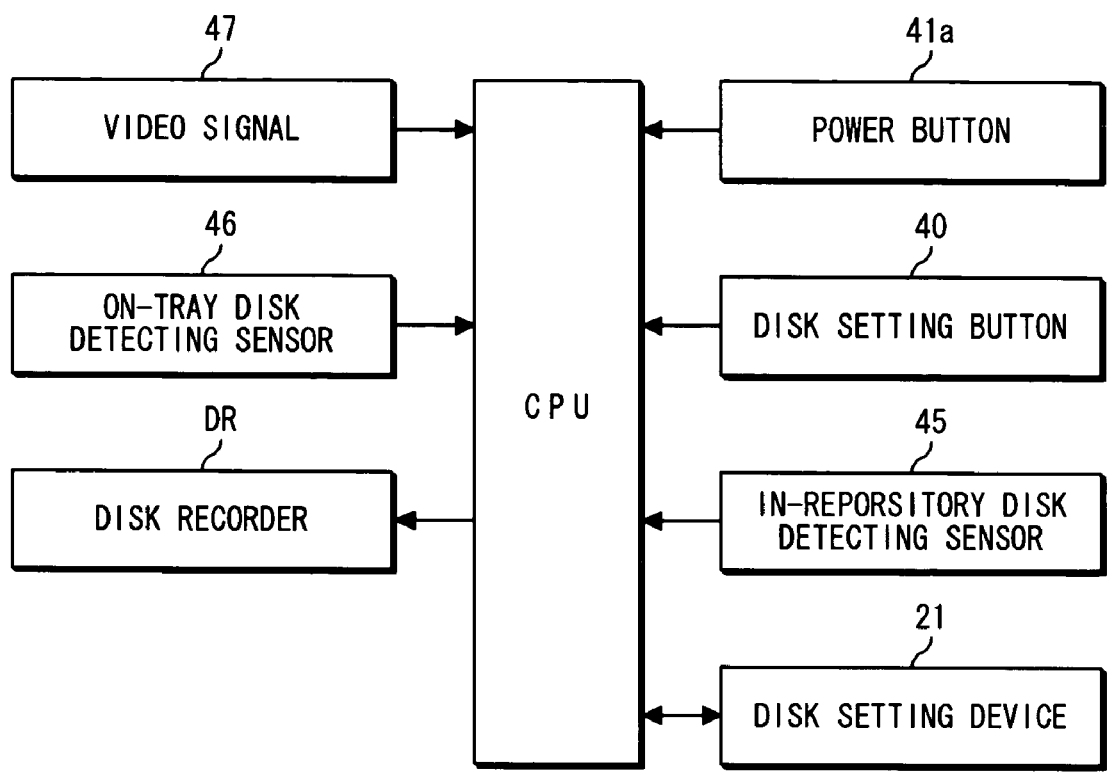
FIG. 8 is a control circuit of a processor in the DVD recorder.

FIG. 8 shows a control circuit of a processor CPU for controlling the DVD recorder and is adapted to be driven by turning the disk setting button 40 on to drive and control the disk setting device 21 and the disk recorder DR based on detection signals from an in-repository disk detecting sensor 45 for detecting whether or not there are any disks D1 to Dn in the disk repository 20 and an on-tray disk detecting sensor 46 for detecting whether or not there is no disk on the tray 4, and then to record vide information based on a video signal 47 from a TV receiver, etc. onto the disks D1 to Dn.

Figure 9:
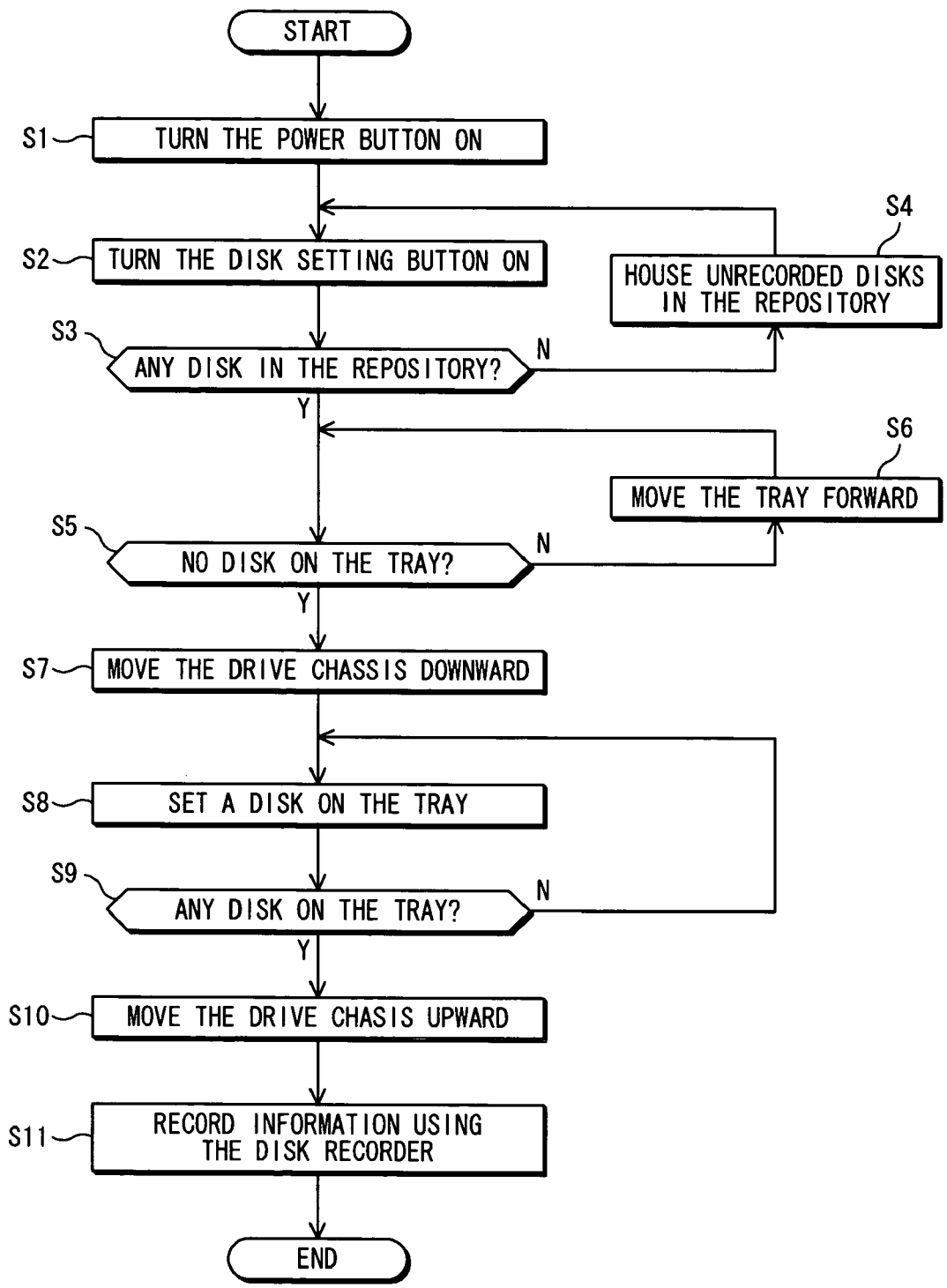
FIG. 9 is a flow chart showing a control procedure of the processor in the DVD recorder.

To describe a control procedure of the processor CPU based on FIG. 9, after the power button 41a is turned on as shown in step S1, the routine goes to step S2 in which the disk setting button 40 is turned on. Thus, the routine goes to step S3 in which it is determined by the in-repository disk detecting sensor 45 whether or not there are any disks D1 to Dn in the disk repository 20, and if no, the routine goes to step S4 in which the opening and closing door 28 is opened to house disks D1 to Dn in the disk repository 20. If yes in step S3, the routine goes to step S5 in which it is determined by the on-tray disk detecting sensor 46 whether or not there is no disk on the tray 4, and if any disk, the routine goes to step S6 in which the eject button 42 is pressed to move the tray 4 in the forward direction "a" and to remove the disk on the tray 4, and then the eject button 42 is pressed again to move the tray 4 in the backward direction "b" so that the tray 4 is housed in the chassis 1. If no disk in step S5, the routine goes to step S7 in which the drive chassis 5 is moved in the downward direction "d" so that the turntable 8 gets lower than the tray 4 (refer to FIGS. 3 and 4 (a)). Subsequently, the routine goes to step S8 in which the pinion 35 in the disk setting device 21 is driven in the normal direction "g" to move the push-out plate 33 in the left direction "e" and to cause the push-out plate 33 to enter the clearance 26 between the disk placing base 24 and the guide frame 25 and to push only one disk D1 out of the guide frame 25 to set the disk on the tray 4. Then, the routine goes to step S9 in which it is determined by the on-tray disk detecting sensor 46 whether or not the disk D1 is on the tray 4, and if no, the routine returns to step S8 to repeat the above-described operation. If yes in step S9, the routine goes to step S10 in which the drive chassis 5 is moved in the upward direction "c" so that the disk D1 on the tray 4 is lifted by the turntable 8 (refer to FIG. 4 (b)). Next, the routine goes to step S11 in which the disk D1 is rotated by the spindle motor 9 at a high speed so that information based on the video signal 47 is recorded onto the disk D1 through the optical pickup 7.

In accordance with the arrangement above, when the processor CPU is put into operation only by pressing the disk setting button 40, the disk setting device 21 can be driven and controlled to push only one disk D1 out of the guide frame 25 in the disk repository 20 to set the disk on the tray 4, and subsequently the disk recorder DR can be driven and controlled to record information onto the disk D1, whereby the series of operations can be performed more quickly with an extremely small time loss between setting of the disk and recording relative to the conventional case where the tray 4 is moved in the forward and backward directions "a" and "b" to set the disk D1 one by one for recording (refer to FIGS. 10 and 11).

What is claimed is:

1. A disk apparatus in which a disk recorder is provided in a chassis, said disk recorder having: a tray movable in the forward and backward directions; a drive chassis movable in the upward and downward directions; an optical pickup arranged on said drive chassis; and a spindle motor accompanied with a turntable, and being adapted to move said drive chassis in the upward direction so that a disk placed on said tray is lifted by said turntable and rotated at a high speed to record information onto said disk through said optical pickup, wherein in said chassis, there are provided a disk repository adjacent to said disk recorder and a disk setting device for pushing disks one by one out of said disk repository to set each disk on said tray, said disk repository having: a disk placing base arranged in the vicinity of said tray with the upper surface thereof being positioned slightly above said tray; a guide frame having an approximate U shape when viewed from above with the inside diameter thereof being set slightly greater than the outside diameter of said disk and arranged above said disk placing base with a clearance greater than one disk's worth of thickness but smaller than two disks' worth of thickness from the upper surface of said disk placing base; and an opening and closing door arranged openably at a disk insertion slot that is opened in the front surface of said chassis in such a manner as to face said guide frame, said disk setting device having: a push-out plate arranged on said disk placing base movably in the horizontal direction and passable through said clearance between said disk placing base and said guide frame with the thickness thereof being set smaller than one disk's worth of thickness; a rack provided integrally on said push-out plate in a protruding manner; and a pinion to be engaged with said rack, it being arranged that when said pinion is driven in the normal direction to cause said push-out plate to enter said clearance between said disk placing base and said guide frame and to push only one disk out of said guide frame to set said disk on said tray, the length of a portion of said push-out plate entering said guide frame is equal to or greater than one-half of the inside diameter of said guide frame, and wherein said opening and closing door is adapted to be opened to insert disks in said guide frame through said disk insertion slot and to place said disks on said disk placing base, and then said pinion in said disk setting device is adapted to be driven in the normal direction to cause said push-out plate to enter said clearance between said disk placing base and said guide frame and to push only one disk out of said guide frame to set said disk on said tray.

2. A disk apparatus in which a disk recorder is provided in a chassis, said disk recorder having: a tray movable in the forward and backward directions; a drive chassis movable in the upward and downward directions; an optical pickup arranged on said drive chassis; and a spindle motor accompanied with a turntable, and being adapted to move said drive chassis in the upward direction so that a disk placed on said tray is lifted by said turntable and rotated at a high speed to record information onto said disk through said optical pickup, wherein in said chassis, there are provided a disk repository adjacent to said disk recorder and a disk setting device for pushing disks one by one out of said disk repository to set each disk on said tray:

wherein said disk repository has: a disk placing base arranged in the vicinity of said tray with the upper surface thereof being positioned slightly above said tray; a guide frame having an approximate U shape when viewed from above with the inside diameter thereof being set slightly greater than the outside diameter of said disk and arranged above said disk placing base with a clearance greater than one disk's worth of thickness but smaller than two disks' worth of thickness from the upper surface of said disk placing base; and an opening and closing door arranged openably at a disk insertion slot that is opened in the front surface of said chassis in such a manner as to face said guide frame; and wherein said opening and closing door is adapted to be opened to insert disks in said guide frame through said disk insertion slot and to place said disks on said disk placing base, and then said disk setting device is adapted to push disks one by one out of said guide frame to set each disk on said tray.

3. The disk apparatus according to claim 2, wherein said disk setting device has: a push-out plate arranged on said disk placing base movably in the horizontal direction and passable through said clearance between said disk placing base and said guide frame with the thickness thereof being set smaller than one disk's worth of thickness; a rack provided integrally on said push-out plate in a protruding manner; and a pinion to be engaged with said rack, it being arranged that when said pinion is driven in the normal direction to cause said push-out plate to enter said clearance between said disk placing base and said guide frame and to push only one disk out of said guide frame to set said disk on said tray, the length of a portion of said push-out plate entering said guide frame is equal to or greater than one-half of the inside diameter of said guide frame.

4. A disk recording method to be used in a disk apparatus in which a disk recorder is provided in a chassis, said disk recorder having: a tray movable in the forward and backward directions; a drive chassis movable in the upward and downward directions; an optical pickup arranged on said drive chassis; and a spindle motor accompanied with a turntable, and being adapted to move said drive chassis in the upward direction so that a disk placed on said tray is lifted by said turntable and rotated at a high speed to record information onto said disk through said optical pickup, wherein in said chassis, there are provided a disk repository adjacent to said disk recorder and a disk setting device for pushing disks one by one out of said disk repository to set each disk on said tray, said disk repository having: a disk placing base arranged in the vicinity of said tray with the upper surface thereof being positioned slightly above said tray; a guide frame having an approximate U shape when viewed from above with the inside diameter thereof being set slightly greater than the outside diameter of said disk and arranged above said disk placing base with a clearance greater than one disk's worth of thickness but smaller than two disks' worth of thickness from the upper surface of said disk placing base; and an opening and closing door arranged openably at a disk insertion slot that is opened in the front surface of said chassis in such a manner as to face said guide frame, said disk setting device having: a push-out plate arranged on said disk placing base movably in the horizontal direction and passable through said clearance between said disk placing base and said guide frame with the thickness thereof being set smaller than one disk's worth of thickness; a rack provided integrally on said push-out plate in a protruding manner; and a pinion to be engaged with said rack, it being arranged that when said pinion is driven in the normal direction to cause said push-out plate to enter said clearance between said disk placing base and said guide frame and to push only one disk out of said guide frame to set said disk on said tray, the length of a portion of said push-out plate entering said guide frame is equal to or greater than one-half of the inside diameter of said guide frame, and wherein there is provided a processor adapted to be driven by turning a disk setting button on to drive and control said disk setting device and said disk recorder based on detection signals from an in-repository disk detecting sensor and an on-tray disk detecting sensor, said processor being adapted to operate in such a manner that when said disk setting button is turned on, it is determined by said in-repository disk detecting sensor whether or not there is any disk in said disk repository, and if any, it is determined by said on-tray disk detecting sensor whether or not there is no disk on said tray, and if no, said drive chassis is moved in the downward direction so that said turntable gets lower than said tray, and said pinion in said disk setting device is driven in the normal direction to cause said push-out plate to enter said clearance between said disk placing base and said guide frame and to push only one disk out of said guide frame to set said disk on said tray, and then said drive chassis is moved in the upward direction so that said disk on said tray is lifted by said turntable and rotated at a high speed to record information onto said disk through said optical pickup.

* * * * *